(12) United States Patent
Shanler

(10) Patent No.: US 6,827,905 B2
(45) Date of Patent: Dec. 7, 2004

(54) PIN TOOL APPARATUS AND METHOD

(75) Inventor: Michael S. Shanler, Somerville, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 493 days.

(21) Appl. No.: 10/045,872

(22) Filed: Jan. 14, 2002

(65) Prior Publication Data

US 2003/0134428 A1 Jul. 17, 2003

(51) Int. Cl.⁷ .............................. B01L 3/02; B01L 3/00; B01L 1/26; G01N 1/10
(52) U.S. Cl. .................. 422/100; 422/99; 436/180; 73/863.31; 73/863.32; 73/864; 73/864.01; 73/864.24
(58) Field of Search ................... 422/99, 100; 436/180, 436/174; 73/863.31, 863.32, 864, 864.01, 864.24

(56) References Cited

U.S. PATENT DOCUMENTS

| | | | |
|---|---|---|---|
| 4,258,761 A * | 3/1981 | Bennett, Jr. ................. 141/242 |
| 5,213,766 A * | 5/1993 | Flesher et al. ............... 422/102 |
| 5,756,050 A * | 5/1998 | Ershow et al. ............... 422/100 |
| 5,759,784 A * | 6/1998 | Asp et al. ....................... 435/6 |
| 5,763,278 A | 6/1998 | Sickinger et al. |
| 5,795,748 A | 8/1998 | Cottingham |
| 6,051,190 A * | 4/2000 | Birch et al. .................. 422/100 |
| 6,090,251 A * | 7/2000 | Sundberg et al. ............ 204/453 |
| 6,102,984 A | 8/2000 | Carl |
| 6,116,099 A | 9/2000 | Carl |
| 6,143,250 A | 11/2000 | Tajima |
| 6,148,878 A | 11/2000 | Ganz et al. |
| 6,207,031 B1 | 3/2001 | Adourian et al. |
| 6,221,317 B1 | 4/2001 | Carl |
| 6,238,626 B1 | 5/2001 | Higuchi et al. |
| 6,255,119 B1 * | 7/2001 | Baier .......................... 436/180 |
| 6,309,891 B1 | 10/2001 | Shalon et al. |
| 6,506,611 B2 * | 1/2003 | Bienert et al. ............... 436/180 |
| 6,551,557 B1 * | 4/2003 | Rose et al. .................. 422/100 |
| 6,575,209 B2 * | 6/2003 | Gora ........................... 141/238 |
| 6,579,499 B1 * | 6/2003 | Kennedy et al. ............. 422/100 |
| 6,592,819 B1 * | 7/2003 | Ogura ........................... 422/63 |
| 6,610,253 B2 * | 8/2003 | Kennedy et al. ............. 422/100 |
| 6,689,323 B2 * | 2/2004 | Fisher et al. ................. 422/100 |
| 6,752,182 B2 * | 6/2004 | Atkinson et al. ............ 141/130 |
| 6,756,232 B1 * | 6/2004 | Schermer et al. ............ 436/180 |
| 2001/0019845 A1 * | 9/2001 | Bienert et al. ............... 436/181 |
| 2001/0049149 A1 | 12/2001 | Kennedy et al. |
| 2003/0054565 A1 * | 3/2003 | Lecloux et al. ............. 436/181 |
| 2003/0059344 A1 * | 3/2003 | Brady et al. ................. 422/100 |
| 2003/0086827 A1 * | 5/2003 | Haslam et al. ............... 422/100 |
| 2003/0124735 A1 * | 7/2003 | Nanthakumar et al. ..... 436/180 |
| 2004/0000201 A1 * | 1/2004 | Deppermann ............ 73/864.45 |

FOREIGN PATENT DOCUMENTS

GB    1324201 A    7/1973

* cited by examiner

Primary Examiner—Arlen Soderquist
Assistant Examiner—Brian R. Gordon
(74) Attorney, Agent, or Firm—Nanette S. Thomas

(57) ABSTRACT

A pin tool assembly is provided for transferring small amounts of liquids to a substrate. The assembly includes a base plate with an array of apertures formed therethrough. Pins are disposed in the apertures. The pins and the apertures are dimensioned to permit sliding movement along the axis of the pins but to prevent wobbling movement. A weight plate is mounted over the pins to urge the pins into a fully seated position in the apertures. A transition cover is releasably engaged over the base plate. The cover includes a plurality of upwardly opening receptacles for releasable engagement with a pipette head. The pipette head can be employed with a robotic device for moving the pin tool assembly from a well plate or other liquid source to a selected destination for the liquid. The pin tool assembly then can be separated from the pipette head and discarded or recycled.

18 Claims, 4 Drawing Sheets

PIN TOOL APPARATUS AND METHOD

FIELD OF THE INVENTION

The invention relates to a pin tool for efficient low volume liquid transfer.

BACKGROUND OF THE INVENTION

Laboratory procedures often require a specified volume of a liquid to be placed in communication with another liquid, a sample of tissue, a filter, a piece of blotter paper or the like. This liquid transfer typically is carried out with a pipette. A pipette is a small hollow tube that may have a conically tapered end. The end of the pipette can be placed in communication with a supply of liquid so that a selected volume of liquid is urged into the pipette. The pipette then is transferred to a specified destination, and liquid in the pipette is dispensed into a small receptacle, such as a microtitre plate, or onto a substrate, such as a piece of blotter paper, a filter or a sample of tissue.

Many liquid transfer systems employ a single pipette and an apparatus for sequentially moving the pipette between the fluid source and the destination. The prior art also includes apparatus with an array of pipettes mounted to a plate such that the respective pipettes are substantially parallel and such that the ends of the pipettes are substantially coplanar. The array of pipettes can be transferred in unison to the liquid source for filing. The array of filled pipettes then can be moved to the destination where the collected liquid is aspirated. Standards have been developed throughout the industry for the number of pipettes incorporated into such an array, the spacing between the pipettes in the array and the footprint dimensions for both the plate that supports the pipettes and the apparatus with which the plate cooperates for collecting and aspirating the liquid.

Pipettes are capable of dispensing liquids in amounts as small as 500 nL. However, many laboratory tests enable procedures to be performed with much smaller volumes of liquid. As a result, liquid transfer systems have been developed that rely upon pins in place of pipettes to transfer small volumes of liquid. More particularly, a pin or an array of pins is dipped a selected distance into a liquid, and then is withdrawn. A small volume of the liquid remains on the exterior of the pin. The pin or the array of pins then is transferred to the destination, and is tapped or stamped against the reservoir or substrate. The tapping or stamping of the pin causes the liquid that had remained on the exterior of the pin to "touch off". Pin tools enable much smaller volumes of liquids to be transferred, and hence pin tools lower costs associated with the liquids that are being transferred. Additionally, pin tools enable a greater concentration of analytical tests to be performed within a given amount of space.

Prior art pin tool liquid transfer systems have either been manually operative or have incorporated the pin tool integrally into the robotic apparatus. Manual pin tool liquid transfer systems are slow and systems where the pin tool is an integral part of a robotic transfer system require downtime for periodic pin cleaning. Thus, prior art pin dispensing systems have included inefficiencies that can offset the efficiencies enabled by a small apparatus and small volume liquid transfers.

SUMMARY OF THE INVENTION

The subject invention is directed to a disposable or recyclable pin tool assembly for transferring low volumes of liquid. The pin tool assembly includes a base plate for carrying an array of pins. The base plate is substantially planar and may be molded unitarily from a plastic material. The base is formed with a plurality of apertures for slidably receiving a corresponding plurality of pins. The number of pins may vary from one application to the next. However, the number of pins preferably conforms to the number and spacing of wells in a conventional multi-well source plate. Hence, arrays of apertures in the base plate preferably equal 96, 384 or 1,536 in accordance with the number of wells in a conventional source plate.

The pins are mounted in the apertures of the base to prevent side-to-side movement or wobbling of the pins in the base plate. Additionally, each pin may be formed with an enlarged head that prevents the pin from falling completely through the respective aperture in the base plate. However, slight movement of each pin along its axis is permitted.

A weight plate may be provided across the heads of the respective pins for biasing the heads of the pins toward the base plate. However, a slight movement of individual pins can be accommodated against forces of the weight plate to compensate for dimensional inconsistencies in the wells of the source plate. Hence, all of the pins can be dipped equal distances into the wells, and substantially equal volumes of liquid can be transferred.

The pin tool assembly further comprises a transition cover that covers and engages the weight plate and the base plate.

The transition cover includes an outer surface that faces away from both the weight plate and the base plate. The outer surface may be formed with engagement means for releasable engagement with a conventional pipette head. More particularly, the pipette head includes a plate with means for gripping by a robotic apparatus. The lower surface of the plate includes a standard array of frustoconical pipettes that normally could be used for transferring larger volumes of liquid. The pipettes of the pipette head are dimensioned and configured for frictional engagement with the engagement means of the transition cover. The engagement means may be internal surfaces of recesses in the transition cover. The recesses in the transition cover may correspond one-for-one with the pipettes in the pipette head. Alternatively, there may be fewer recesses than pipettes, and the specific number of recesses is selected to ensure sufficient frictional engagement forces between the pipettes and the recesses. Thus the pipette head may be urged into engagement with the transition cover so that the tapered pipettes nest in and frictionally engage the recesses in the transition cover. The pipette head then can be moved for transporting the pin tool assembly to a source plate and then to the liquid destination.

The pin tool assembly may be employed with a docking tray. The docking tray includes a bottom wall, a plurality of upstanding side walls and an open top. The spacing of the side walls conforms to proposed SBS standards/ANSI and permits the pin tool assembly to be nested in the docking tray with the pins substantially enclosed and protected. The side walls of the docking tray may be formed to define a step or shelf on which the base plate may be seated, and the distance from the step to the bottom wall of the docking tray may exceed the projecting distance of the pins. Hence, the pins are safely surrounded and enclosed by the docking tray.

The pin tool assembly and the docking tray may be nested with the pins safely enclosed by the docking tray, as explained above. The pipette head then may be moved by a robotic device so that at least certain of the pipettes are urged into the recesses in the transition cover for frictional engagement with the recesses. The robotic device then lifts the pipette head away from the docking tray and moves the pin tool assembly to the source plate, so that the pins enter the respective wells of the source plate. The pins may move relative to the base plate to ensure substantially equal insertion into the wells for all of the pins. The robotic device then lifts the pin tool assembly away from the source plate and moves the pin tool assembly toward its destination. The pins are stamped or tapped against the destination surface to "touch off" or dislodge the droplets of the liquid formed on the pins. The robotic device then moves away from the destination and ejects the pin tool assembly. The ejected pin tool assembly may be placed back in the docking tray, discarded or cleaned and recycled. The robotic device then moves the pipette head toward the next pin tool assembly to repeat the process.

DETAILED DESCRIPTION OF THE INVENTION

Figure 1:
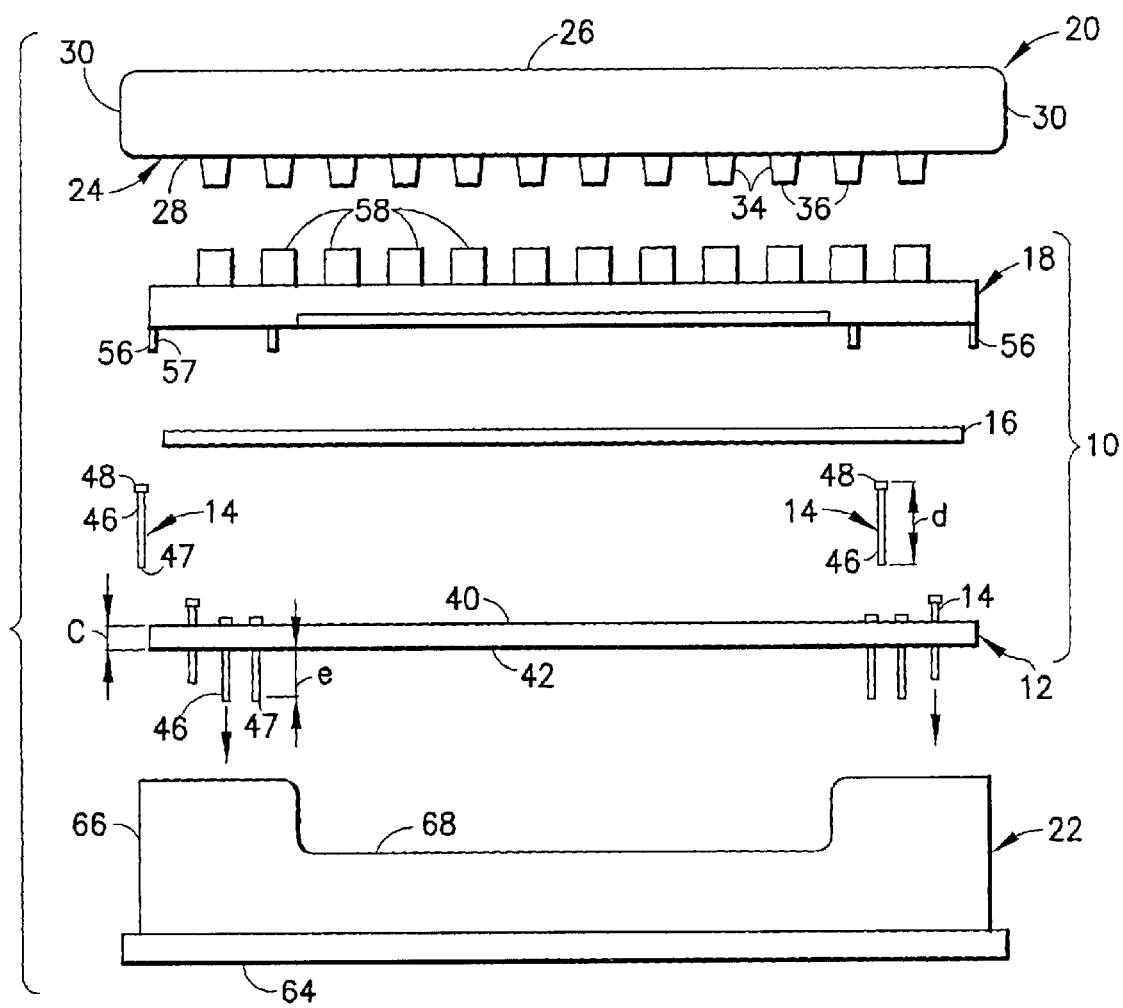
FIG. 1 is an exploded side elevational view of a pin tool assembly, docking tray and pipette head in accordance with the invention.
Figure 2:
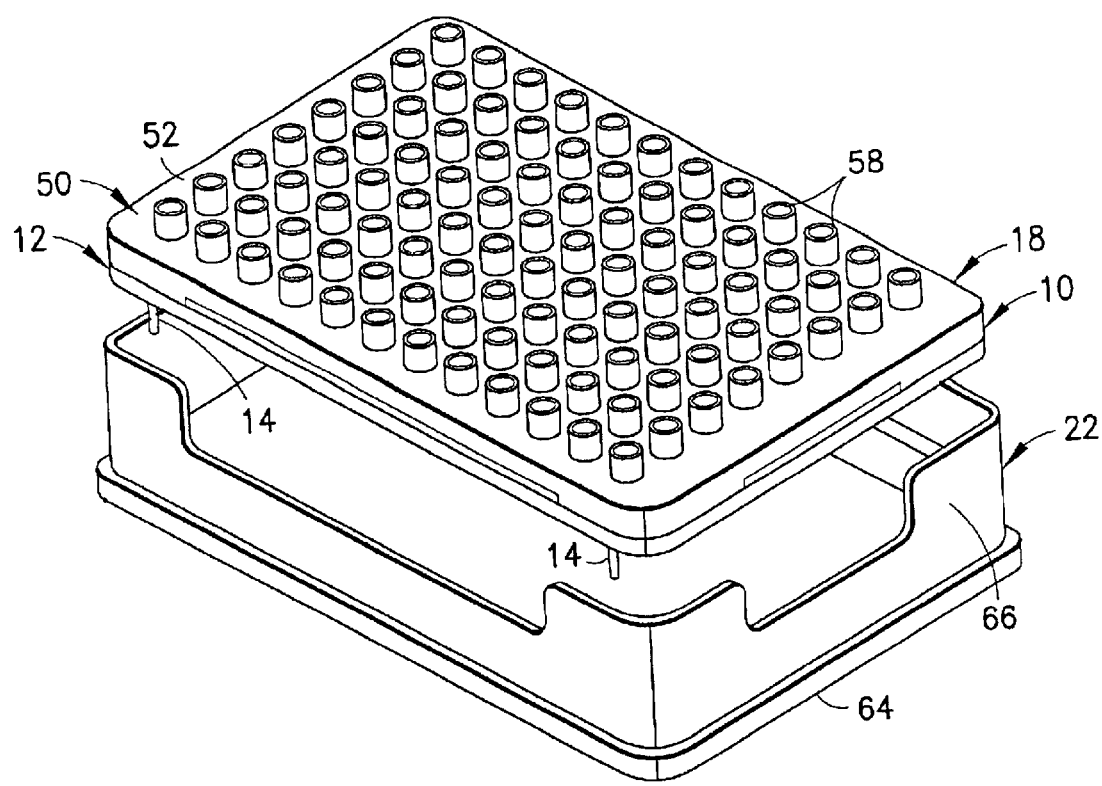
FIG. 2 is an exploded perspective view of the pin tool assembly and docking tray.
Figure 3:
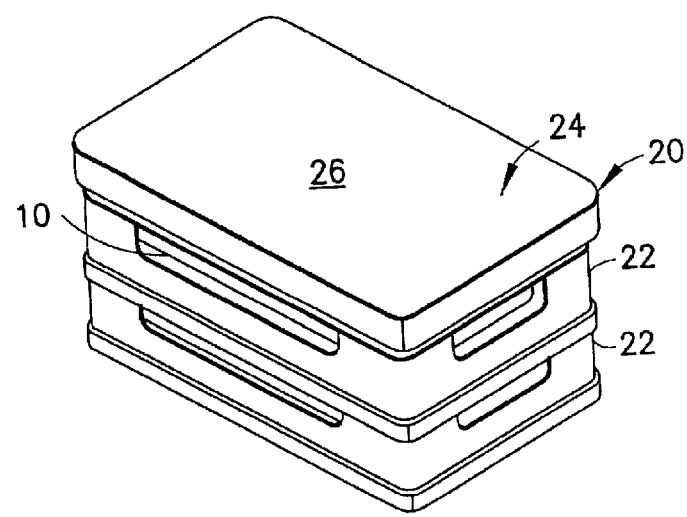
FIG. 3 is a perspective view of stacked pin tool assemblies and docking trays with the pipette head engaging the uppermost pin tool assembly
Figure 4:
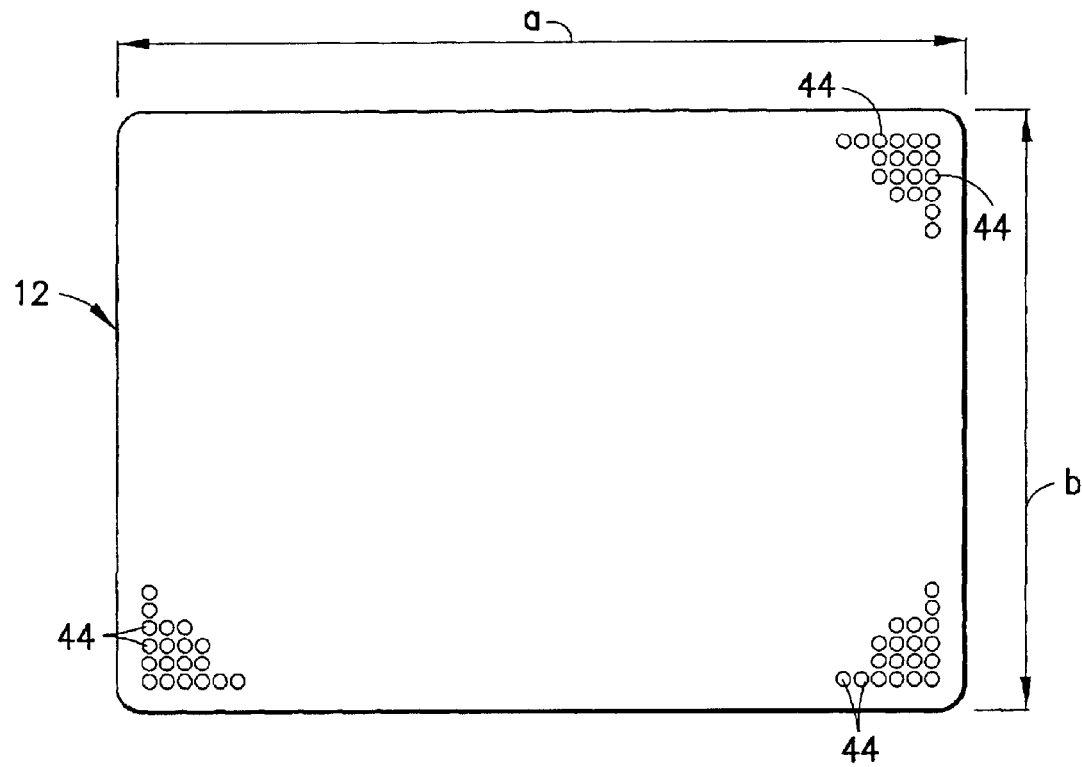
FIG. 4 is a top plan view of the base plate of the pin tool assembly.
Figure 5:
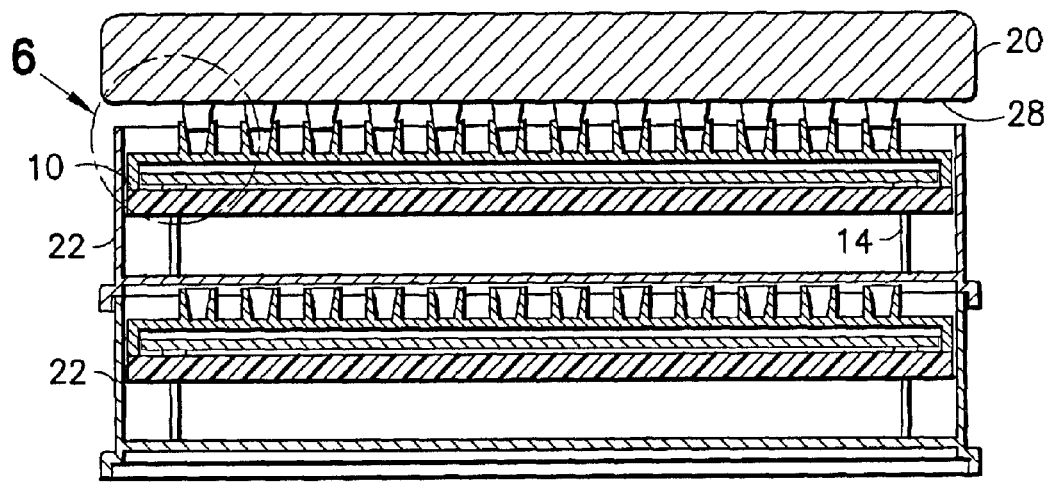
FIG. 5 is a cross-sectional view taken along line 5—5 in FIG. 3.

A pin tool assembly in accordance with the subject invention is identified generally by the numeral 10 in FIGS. 1–5. Pin tool assembly 10 includes a base plate 12, a plurality of pins 14, a weight plate 16 and a transition cover 18. Pin tool assembly 10 is used with a prior art pipette head 20 and with a docking tray 22. Docking tray 22 is stackable with other identical docking trays, and two such docking trays 22 are illustrated in FIGS. 3 and 5.

Prior art pipette head 20 includes a thick planar plate 24 with opposite top and bottom surface 26 and 28. A plurality of side surfaces 30 project up from bottom surface 28 and are configured for secure mounting to a robotic device (not shown) that is capable of moving pipette head 20 through a preprogrammed array of X, Y and Z coordinates.

Figure 6:
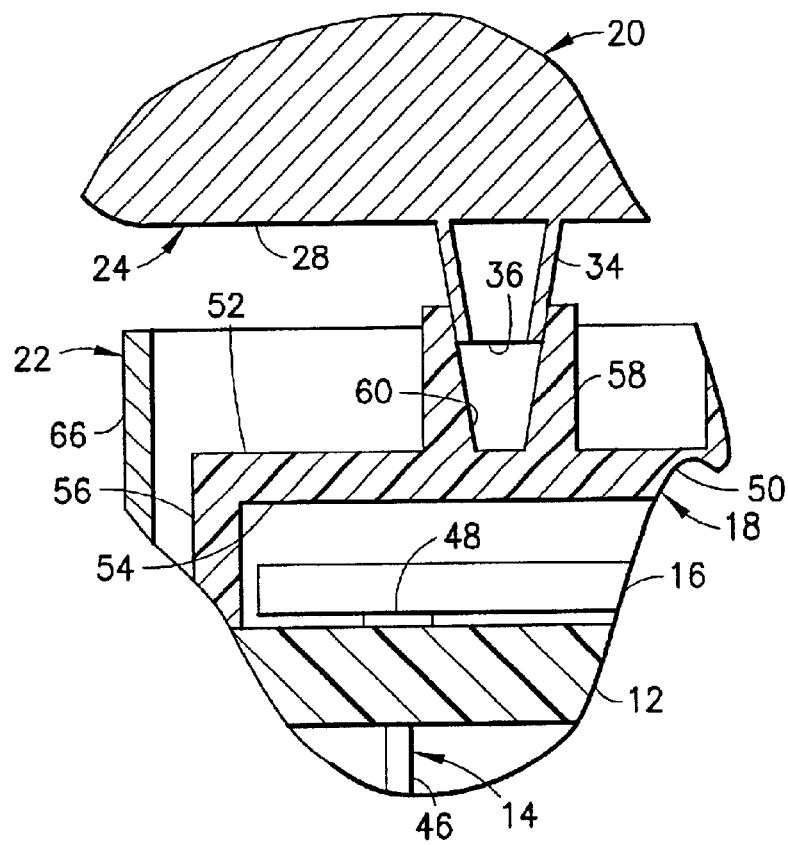
FIG. 6 is an enlarged cross-sectional view of a portion of the pin tool assembly and pipette head in the engaged condition shown in FIG. 5.

Bottom surface 28 of plate 24 of pipette head 20 is characterized by an array of pipettes 34. Each pipette 34 is a hollow truncated cone or frustum, as shown most clearly in FIG. 6. Pipettes 34 each have a bottom face 36, and bottom faces 36 lie on a common plane. Pipette head 20 is capable of being used as a pipetter for dipping into wells and obtaining relatively large samples (e.g., 500 nL) of a liquid. However, pipette head 20 is not used directly for obtaining and dispensing liquid in accordance with the subject invention.

Base plate 12 of pin tool assembly 10 is a rigid substantially rectangular planar plate that is formed unitarily from a plastic material. More particularly, base plate 12 has a top face 40, a bottom face 42 and a plurality of substantially identical apertures 44 that extend through base plate 12 entirely from top face 40 to bottom face 42 thereof. In the illustrated embodiment, base plate 12 has 1,536 apertures 44 in forty-eight equally spaced rows, with each row having thirty-two equally spaced apertures. Base plate 12 has a length "a", a width "b" and a thickness "c".

Pins 14 are substantially identical to one another and are equal in number to the number of apertures 44. Thus, in the illustrated embodiment, 1,536 pins are provided. Each pin 14 includes a shank 46, a tip 47 and a head 48. Each shank 46 has a cross-section dimensioned to fit snuggly in one of apertures 44. Thus, wobbling or transverse movement of pins 14 in apertures 44 is prevented. However, axial movement of pins 14 in apertures 44 is permitted. Head 48 of each pin 14 is cross-sectionally larger than apertures 44 in base plate 12. Hence, heads 48 prevent pins 14 from passing entirely through apertures 44. Shanks 46 of pins 14 project from heads 48 a distance "d" that exceeds thickness "c" of base plate 12. Thus, tips 47 of pins 14 project a distance "e" beyond bottom face 42 of base plate 12.

Weight plate 16 is a substantially rectangular planar structure with length and width dimensions equal to or less than length "a" and width "b" of base plate 12. Thus, weight plate 16 can rest on heads 48 of all pins 14 mounted in base plate 12. Weight plate 16 urges pins 14 down relative to base plate 12. However, at least selected pins 14 can lift up or "float" in response to forces generated on tips 47 of pins 14 due to dimensional variations of a well plate with which pin tool 10 is used.

Transition cover 18 is unitarily molded from a plastic material. However, a machined transition cover also may be employed. Transition cover 18 includes a top wall 50 with a top surface 52 and a bottom surface 54. A plurality of side walls 56 extend down from top wall 50 and include projections 57 for releasably engaging portions of base plate 12.

Top surface 52 of top wall 50 is characterized by a plurality of upwardly projecting pipette receptacles 58. Receptacles 58 are substantially tubular structures with an inner surface 60 conforming to the size and shape of pipettes 34 on dispenser head 20. Additionally, pipette receptacles 58 are disposed respectively to register with pipettes 34. In the illustrated embodiment, pipette receptacles 58 are equal in number to the number of pipettes 34. However, fewer pipette receptacles 58 can be provided.

Docking tray 22 is molded unitarily from a plastic material and includes a substantially rectangular planar bottom wall 64 and a plurality of side walls 66 that project up from bottom wall 64. Length and width dimensions defined by side walls 66 conform to a standard foot print size established by the Society of Biological Standards (SBS). Side walls 66 are formed with steps 68 for engaging peripheral portions of pin tool assembly 10. Steps 68 are spaced from bottom wall 64 of docking tray 22 by a distance that slightly exceeds projecting distance "e" of pins 14 from bottom face 42 of base plate 12. Length and width dimensions of side walls 66 of docking tray 22 enable pin tool 10 to be inserted partly into the open top of docking tray 22 with pin tool 10 supported on steps 68 and with pins 14 spaced slightly from bottom wall 64.

Pin tool 10 is assembled initially into the condition shown in FIG. 2. Thus, pins 14 project through apertures 44, and weight plate 16 is positioned on head 48 of pins 14. Transition cover 18 then is disposed over weight plate 16 and is secured releasably with base plate 12. Pin tool assembly 10 then can be nested in docking tray 22.

Pipette head 20 is secured to a robotic device (not shown) preprogrammed for movement through a specified array of X, Y and Z coordinates. The robotic device moves pipette head 20 into juxtaposed relationship with pipette receptacles 58, and then moves pipette head 20 down so that pipettes 34 nest in receptacles 58. Frictional forces between pipettes 34 and receptacles 58 releasably hold pin tool assembly 10 to pipette head 20. The robotic device then lifts pipette head 20 and pin tool assembly 10. Hence, pin tool assembly 10 is separated from docking tray 22. The robotic device then moves pipette head 20 and pin tool assembly 10 into alignment with the wells of a source plate (not shown). A downward movement of pin tool assembly 10 relative to the source plate causes pins 14 to enter into the respective wells and to contact a liquid therein. Selected pins 14 may move or "float" axially relative to base plate 12 to compensate for dimensional discontinuities in the source plate and to ensure substantially equal insertion of each pin 14 into the liquid. The robotic device then moves pipette head 20 and pin tool assembly 10 up and away from the source plate, and to a selected destination. A small volume of liquid (e.g., 10 nL) will remain on each pin 14. Pins 14 can be urged into contact with a substrate at the destination so that a droplet of the liquid on each pin 14 is touched off onto the substrate. The robotic device then moves pipette head 20 and pin tool 10 back to docking tray 22 and separates pin tool assembly 10 from pipette head 20. Thus pin tool assembly 10 remains in docking tray 22. Pin tool assembly 10 and docking tray 22 then can be discarded or recycled for cleaning and reuse. Simultaneously, the robotic device moves pipette head 20 to another pin tool assembly 10.

Figure 7:
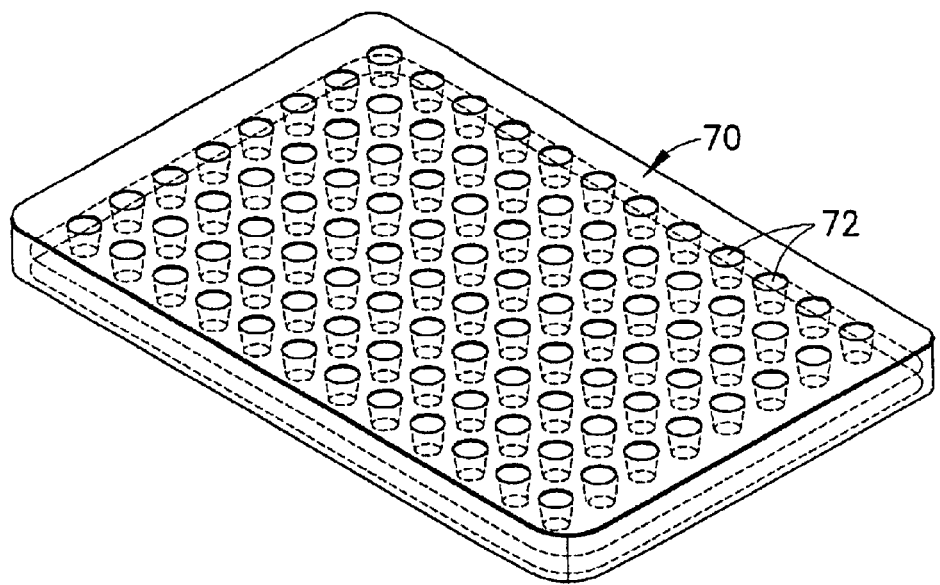
FIG. 7 is a perspective view of an alternate base plate.

FIG. 7 shows an alternate transition cover that is machined from a unitary planar piece of plastic material machined to include tapered apertures 72 that will register respectively with pipettes 34 of pipette head 20. Machined transition cover 70 is employed with base plate 12, pins 14 and weight plate 16 substantially as described above.

The invention has been described with respect to a preferred embodiment. However, various changes can be made without departing from the scope of the invention as defined by the appended claims. For example, a biasing means may be provided between weight plate 16 and transition cover 18. The biasing means may include a plurality of springs or a resilient sheet material. The biasing means functions for urging weight plate 16 and pins 14 down into a fully seated position in base plate 12.

What is claimed is:

1. A pin tool assembly for use with a pipette head, said pipette head having a plurality of pipettes projecting therefrom, said pin tool assembly comprising:

a base plate having a plurality of apertures formed therethrough;

a plurality of pins mounted respectively in said apertures of said base plate, said pins having tips that project from said base plate; and a transition cover mounted over said base plate, said transition cover comprising a plurality of engagement means formed thereon for releasable engagement with said pipettes of said pipette head, whereby said pipette head can be releasably engaged with said pin tool assembly for moving said pin tool assembly between a liquid source, a liquid destination and a discard location.

2. The pin tool assembly of claim 1, wherein said engagement means comprises a plurality of substantially tubular receptacles for releasable engagement with said pipettes.

3. The pin tool assembly of claim 2, wherein said pipettes each comprise a substantially frustum-shaped tip, said receptacles comprising tubular walls dimensioned for frictional engagement over said tips of said pipettes.

4. The pin tool assembly of claim 1, wherein each said pin comprises a substantially cylindrical shank and an enlarged head, said shank of each said pin being dimensioned for slidable engagement respectively in said apertures of said base plate, said head being cross-sectionally larger than said apertures for limiting movement of said pins in said apertures.

5. The pin tool assembly of claim 4, further comprising a weight plate disposed on said heads of said pins and between said base plate and said transition cover, said weight plate urging said heads of said pins toward said base plate while permitting movement of said heads of said pins upwardly away from said base plate in response to forces on said shanks of said pins.

6. The pin tool assembly of claim 1, wherein said transition cover comprises a plurality of resiliently deflectable flanges for releasably engaging said base plate.

7. The pin tool assembly of claim 1, wherein the base plate is unitarily molded from a plastic material.

8. The pin tool assembly of claim 1, wherein the transition cover is unitarily molded from a plastic material.

9. The pin tool assembly of claim 1, further comprising a docking tray for releasably receiving said base plate, said pins and said transition cover such that said docking tray protectively surrounds portions of said pins projecting from said base plate.

10. A pin tool apparatus comprising:

a pin tool assembly having a base plate with a plurality of apertures extending therethrough, a plurality of substantially identical pins, each said pin having a shank and an enlarged head, said shanks of said pins being slidably received in said apertures of said base plate, each said pin having a tip projecting beyond said base plate, said heads of said pins being cross-sectionally larger than said apertures for limiting sliding movement of said pins in said apertures, a weight plate mounted across said heads of said pins for urging said heads of said pins toward said base plate, and a transition cover releasably engaged with said base plate and covering said weight plate, a plurality of substantially tubular engagement surfaces formed on a side of said transition cover facing away from said base plate;

a docking tray releasably supporting said pin tool assembly, such that portions of said pins projecting from said base plate are protectively surrounded by said docking tray; and a pipette head having means for mounting said pipette head to a robotic device and a plurality of pipettes dimensioned for releasable engagement with said engagement surfaces of said transition cover, whereby said pipette head can be engaged with said robotic device and can be releasably engaged with said transition cover for separating said pin tool assembly from said docking tray, moving said pin tool assembly to a source location for collecting liquid on said pins and subsequently depositing said liquid at a selected destination.

11. The pin tool apparatus of claim 10, wherein said pipettes of said pipette head each comprise a conically generated outer surface, said engagement surfaces of said transition cover each comprise a conically generated recess configured for releasable engagement with the conically generated outer surface of one of said pipettes.

12. The pin tool apparatus of claim 11, wherein the transition cover includes a plurality of generally tubular projections, said conically generated recesses being formed in said tubular projections.

13. The pin tool apparatus of claim 10, wherein the base plate is formed unitarily from a plastic material.

14. The pin tool apparatus of claim 10, wherein the transition cover is formed unitarily from a plastic material.

15. A method for transferring liquid, said method comprising:

providing a pipette head with a plurality of conically tapered pipettes;

providing a plurality of pin tool assemblies, each said pin tool assembly having a plurality of pins projecting from said base plate and a transition cover mounted to said base plate, said transition cover comprising a plurality of receptacles configured for releasably engagement respectively with said pipettes of said pipette head;

moving said pipette head toward a selected one of said pin tool assemblies such that said pipettes releasably engage with said receptacles of said selected pin tool assembly;

moving said pipette head and said selected pin tool assembly such that said pins of said selected pin tool assembly enter into at least one source of said liquid;

moving said pipette head and said selected pin tool assembly away from said sources of liquid such that droplets of said liquid remain on said pins;

moving said pipette head and said selected pin tool assembly to a destination such that said droplets of said liquid on said pins are touched off at said destination;

moving said pipette head and said selected pin tool assembly away from said destination; and separating said selected pin tool assembly from said pipette head, thereby enabling said pipette head to releasably engage a second of said pin tool assemblies.

16. The method of claim 15, further comprising the step of providing a plurality of docking trays, each said docking tray being configured for releasably supporting one of said pin tool assemblies, said method further comprising the step of supporting said pin tool assemblies in said docking trays such that said pins of said pin tool assemblies are protectively enclosed by said docking trays, said step of engaging said pipettes with said receptacles is carried out while said selected pin tool assembly is releasably supported in the respective docking tray, said steps of moving said pipette head and said selected pin tool assembly comprising separating said pin tool assembly from said docking tray.

17. The method of claim 16, further comprising the step of returning said selected pin tool assembly to the respective docking tray prior to separating said pipette head from said selected pin tool assembly.

18. The method of claim 15, wherein the step of moving said pipette head and said select pin tool assembly away from said liquid comprises collecting droplets of approximately 10 nL on each said pin.

* * * * *